(12) United States Patent
Kanazawa et al.

(10) Patent No.: US 7,096,011 B2
(45) Date of Patent: Aug. 22, 2006

(54) ELECTRONIC APPARATUS AND SERVICE PROVIDING METHOD USED IN THE ELECTRONIC APPARATUS

(75) Inventors: Koji Kanazawa, Ome (JP); Masafumi Tamura, Chofu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 10/805,320

(22) Filed: Mar. 22, 2004

(65) Prior Publication Data

US 2004/0214617 A1    Oct. 28, 2004

(30) Foreign Application Priority Data

Apr. 28, 2003  (JP) ............................. 2003-123702

(51) Int. Cl.
*H04B 7/00* (2006.01)
*H04B 1/38* (2006.01)
*H04M 11/04* (2006.01)
*H04M 1/00* (2006.01)
*G08G 23/00* (2006.01)

(52) U.S. Cl. .................... 455/421; 455/41.2; 455/41.3; 455/404.1; 455/404.2; 455/550.1; 455/556.1; 455/574; 340/573.1; 340/573.4

(58) Field of Classification Search ...... 455/41.2–41.3, 455/3.01, 74, 3.03, 567, 67.11, 67.7, 417, 455/404.1, 404.2, 412.2, 418–421, 422.1, 455/423–425, 462, 466, 550.1, 557–558, 455/554.1–554.2, 556.1, 556.2, 574, 561, 455/456.1, 456.3; 370/395.52, 395.53; 340/500, 340/539.1, 539.11, 539.12, 539.13, 539.23, 340/539.19, 539.15, 286.07, 539.21, 686.6, 340/573.1, 573.4

See application file for complete search history.

(56) References Cited

U.S. PATENT DOCUMENTS 5,815,086 A  *  9/1998  Ivie et al. .............. 340/825.52

(Continued)

FOREIGN PATENT DOCUMENTS

CN        1319318 A     10/2001

(Continued)

OTHER PUBLICATIONS

Notification of Reasons for Rejection mailed Jul. 12, 2005, by the Japanese Patent Office, in Japanese Patent Application No. 2003-123702 and English translation thereof.

(Continued)

*Primary Examiner*—Charles N Appiah
*Assistant Examiner*—Meless Zewdu
(74) *Attorney, Agent, or Firm*—Finnegan, Henderson, Farabow, Garrett & Dunner, L.L.P.

(57) ABSTRACT

An electronic apparatus includes a communication device that communicates with a mobile device and a plurality of devices via a network. The mobile device is wirelessly connectable to the network. The electronic apparatus further includes a control unit configured to determine whether the mobile device is disconnected from the network, and a message sending unit configured to send an alarm message to one of the devices by communication between the one of the devices and the communication device when the mobile device is disconnected from the network, the one of the devices being currently powered on.

11 Claims, 6 Drawing Sheets

U.S. PATENT DOCUMENTS

| | | | |
|---|---|---|---|
| 6,330,244 B1 * | 12/2001 | Swartz et al. | 370/401 |
| 6,526,581 B1 * | 2/2003 | Edson | 725/74 |
| 6,642,852 B1 * | 11/2003 | Dresti et al. | 340/825.72 |
| 2002/0169583 A1 * | 11/2002 | Gutta et al. | 702/188 |
| 2003/0073412 A1 * | 4/2003 | Meade, II | 455/70 |
| 2004/0078694 A1 * | 4/2004 | Lester et al. | 714/39 |
| 2004/0152460 A1 * | 8/2004 | La et al. | 455/426.1 |

FOREIGN PATENT DOCUMENTS

| | | |
|---|---|---|
| JP | 2001-53779 | 2/2001 |
| JP | 2001-86572 | 3/2001 |
| JP | 2003-36492 | 2/2003 |
| JP | 2003036492 A * | 2/2003 |

OTHER PUBLICATIONS

Notification of the First Office Action mailed Feb. 10, 2006, by the Chinese Patent Office, in Chinese Patent Application No. 200410032949.6.

* cited by examiner

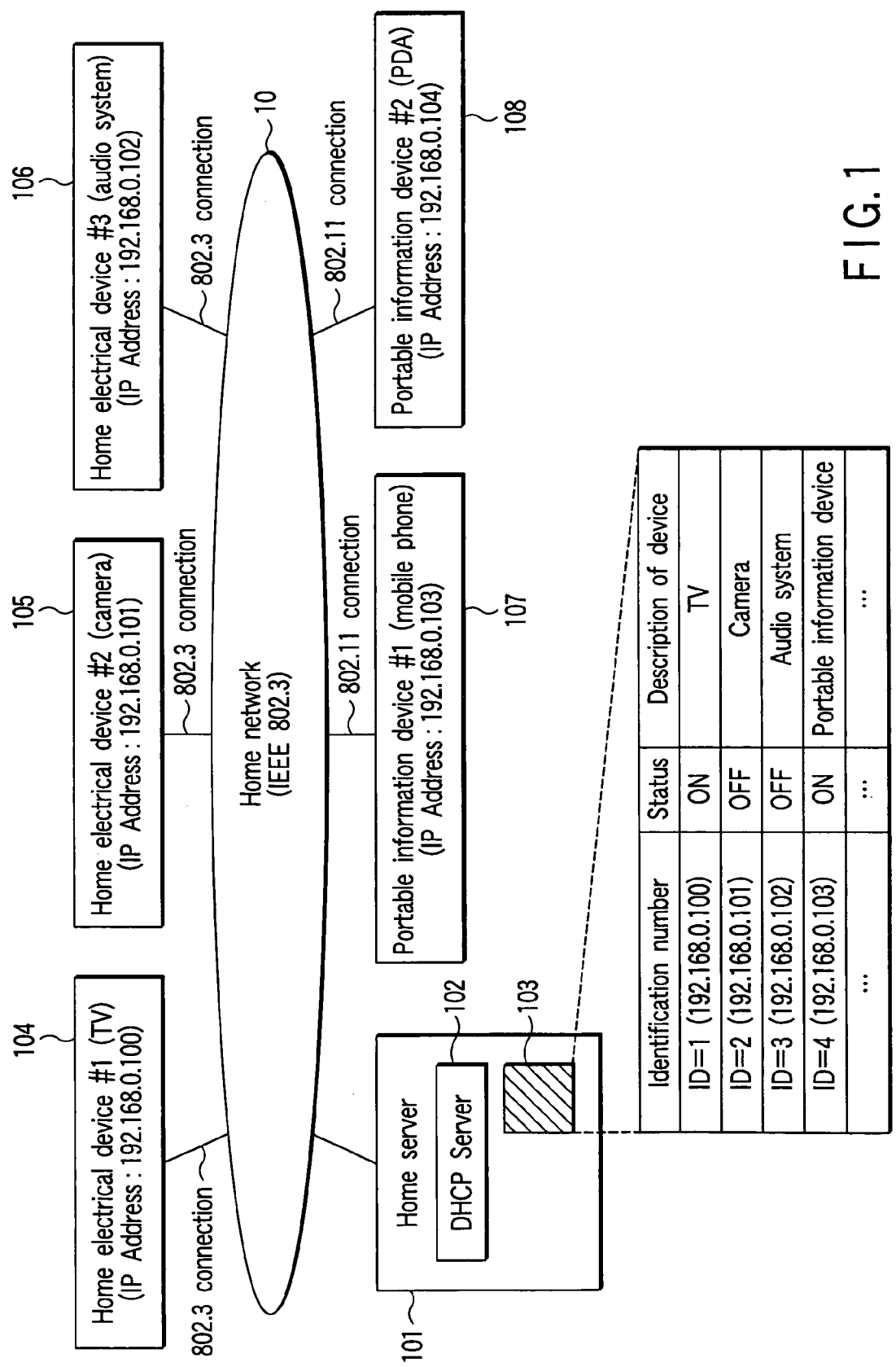
F I G. 1

ELECTRONIC APPARATUS AND SERVICE PROVIDING METHOD USED IN THE ELECTRONIC APPARATUS

CROSS-REFERENCE TO RELATED APPLICATIONS

This application is based upon and claims the benefit of priority from prior Japanese Patent Application No. 2003-123702, filed Apr. 28, 2003, the entire contents of which are incorporated herein by reference.

BACKGROUND OF THE INVENTION

1. Field of the Invention

The present invention relates to an electronic apparatus that carries out communication with a plurality of devices via a network such as a home network and a method of providing each of the devices with service by the electronic apparatus.

2. Description of the Related Art

Recently, a home electrical device such as a TV and an audio system has been loaded with a communication function for communicating with a network as communication technology and information processing technology progress. Accordingly, a home network system for connecting the home electrical devices needs to be configured.

Jpn. Pat. Appln. KOKAI Publication No. 2001-53779 discloses a home network gateway apparatus for connecting a home network to the Internet. This apparatus serves to remotely control home electrical devices, which are connected to a home network, from outside through the Internet.

Recently, a position sensing system has been used as one for protecting elderly persons who wander away from home. The system senses a position of a mobile phone carried by an elderly person to find a place where he or she is wandering away from home. However, the system can specify a destination of an elderly person and not sense the moment when the person goes out of the house.

It is therefore desired that a new system for protecting poriomaniacs using a home network should be achieved.

In the near future, it is expected that not only home electrical devices are connected to each other but also a portable information processing apparatus such as a PDA (personal digital assistant) and a personal computer will be used as a device on a home network. Most portable information processing apparatuses such as a PDA and a personal computer have a wireless communication function. Such a portable information processing apparatus can serve as a mobile device. From now on, it is necessary to achieve a new home network system for linking a mobile device having a wireless communication function such as a PDA and a personal computer and a home electrical device such as a TV and an audio system.

BRIEF SUMMARY OF THE INVENTION

According to an embodiment of the present invention, there is provided an electronic apparatus comprising a communication device which communicates with a mobile device and a plurality of devices via a network, the mobile device being wirelessly connectable to the network, a control unit configured to determine whether the mobile device is disconnected from the network, and a message sending unit configured to send an alarm message to one of the devices by communication between the one of the devices and the communication device when the mobile device is disconnected from the network, the one of the devices being currently powered on.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram of a home network system according to an embodiment of the present invention.

DETAILED DESCRIPTION OF THE INVENTION

Figure 2:
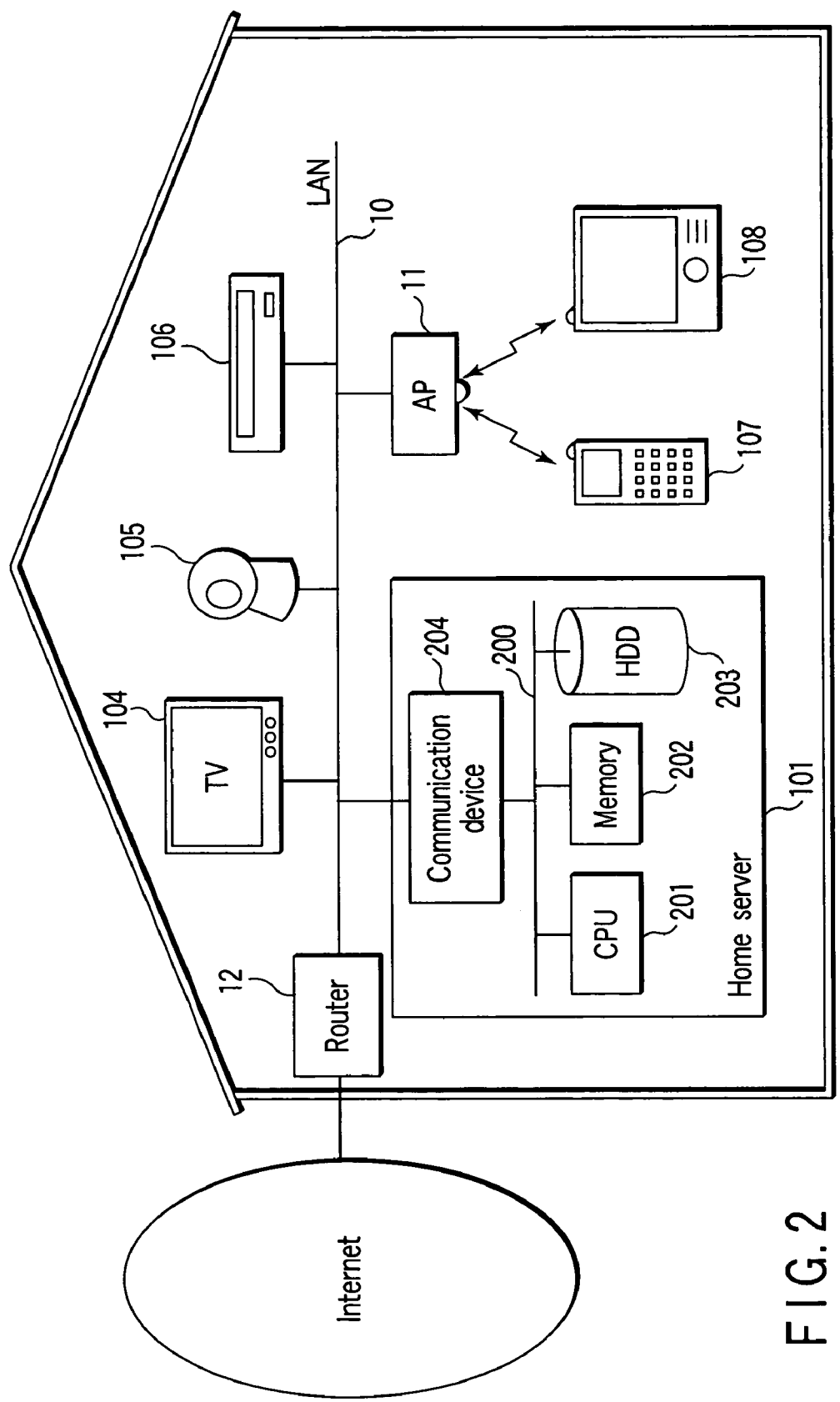
FIG. 2 is a block diagram of a home server in the home network system shown in FIG. 1.

An embodiment of the present invention will now be described with reference to the accompanying drawings.

FIG. 1 shows a configuration of a home network system using an electronic apparatus according to an embodiment of the present invention. The electronic apparatus is a home server 101 that manages a plurality of devices connected to a home network 10.

The home network 10 is an in-home local area network and implemented by, e.g., an IEEE 802.3 network. The home server 101 can communicate with each of devices 104 to 108 via the home network 10. The devices 104 to 108 are connected to the home network 10.

The devices 104 to 106 are home electrical devices. The device 104 is, for example, a TV having a communication function of connecting the device to the home network 10. The device 105 is, for example, a camera (also called a camcorder) having a communication function of connecting the device to the home network 10. The device 106 is, for example, an audio system having a communication function of connecting the device to the home network 10. The TV 104, camera 105 and audio system 106 each have an IEEE 802.3 communication device and are connected to the home network 10 by wire.

The devices 107 and 108 are portable information devices. The device 107 is a mobile device having a communication function of wirelessly connecting the device to the home network 10. The device 107 is, for example, a mobile phone. The device 108 is a mobile device having a communication function of wirelessly connecting the device to the home network 10. The device 108 is, for example, a PDA. The mobile phone 107 and PDA 108 each have a wireless communication device that performs, e.g., IEEE 802.11 wireless communication (wireless LAN), and are wirelessly connected to the home network 10 through a wireless access point or the like.

The home network 10 is not limited to the IEEE 802.3 or IEEE 802.11. For example, it can be implemented by other standards such as USB (universal serial bus), IEEE 1394 and Bluetooth™.

The above home network system employs the Internet Protocol (IP) as communication protocol. An identification number (IP address) is uniquely assigned to each of the devices 104 to 108 and home server 101 which are connected to the home network 10 wirelessly or by wire. The home server 101 has a function of dynamically assigning an IP address to each of the devices 104 to 108 connected to the home network 10.

The above function is fulfilled by a DHCP (dynamic host configuration protocol) server 102 provided in the home server 101. The DHCP server 102 replies to an IP address issuing request from a device connected to the home network 10 and dynamically assigns an IP address to the device. Each of the devices 104 to 108 sends an IP address issuing request to the home server 101 when it is connected to the home network 10. The DHCP server 102 assigns different IP addresses to the devices 104 to 108. For example, the following IP addresses are assigned to the devices 104 to 108.

| TV 104: | IP address = 192.168.0.100 |
| Camera 105: | IP address = 192.168.0.101 |
| Audio system 106: | IP address = 192.168.0.102 |
| Mobile phone 107: | IP address = 192.168.0.103 |
| PDA 108: | IP address = 192.168.0.104 |

The home server 101 uses device management information 103 to manage the IP addresses assigned to the devices on the home network 10, status information of the devices, and description information indicative of descriptions of the devices. The status information represents whether a power state of each of the devices is a power-on state or a power-off state. The description information includes device attribute information indicating, e.g., the names and types of the devices.

When the home server 101 assigns an IP address to a device, it stores the IP address in the device management information 103. The home server 101 communicates with a device to which an IP address is assigned to detect a power-on/power-off state of the device and store the detected power state in the device management information 103 as status information. The home server 101 also communicates with a device to which an IP address is assigned to acquire device attribute information from the device and store the information in the device management information 103 as a description of the device.

The power-on state of a device means that the device is active. In other words, a device in a power-on state is performing its own function. The power-off state of a device means that the device is on standby. In other words, a device in a power-off state is not performing its own function. For example, in a device having a main power and an operation power, the device is in a power-off state (on standby) if the main power is on but the operation power is off. The communication function of each device can usually be carried out while the device is on standby.

FIG. 2 shows an example of a configuration of the home server 101.

As shown in FIG. 2, the home network (LAN) 10 is connected to the Internet via a router 12. The mobile phone 107 and PDA 108 are wirelessly connected to the home network (LAN) 10 through a wireless access point (AP) 11.

The home server 101 includes a system bus 200, a CPU (central processing unit) 201, a memory 202, a hard disk drive (HDD) 203 and a communication device 204. The CPU 201 is a processor that controls an operation of the home server 101 and executes control programs stored in the memory 202.

The hard disk drive (HDD) 203 is a data storage device that stores the device management information 103 described above. The communication device 204 communicates with each of the devices 104 to 108 via the home network 10.

The router 12 can be built in the home server 101. Both the router 12 and wireless access point 11 can also be built in the home server 101.

The following are descriptions of services provided to each of the devices 104 to 108 by the home server 101.

The control programs contain a function of managing the power-on/power-off states of the devices 104 to 108 and a function of providing various services to a user of the home network system using the device management information 103 as well as a function of the DHCP server 102 described above. The following are three main services to be provided.

(1) Automatic Alarm Message Notifying Service:

This service is a function of notifying other devices on the home network 10 of an alarm message when a predesignated mobile device (e.g., mobile phone 107 or PDA 108) is disconnected from the home network 10. The alarm message is sent to a power-on device that is currently powered on via the home network 10. When the mobile device moves outside a communication area capable of wireless communication with the home network 10, they are disconnected from each other. If a mobile device is carried by an elderly poriomaniac, an alarm message can automatically be sent to a power-on device when the person goes out of the house. There is a strong possibility that there is someone near the power-on device. If the TV 104 turns on when the mobile device and the home network 10 are disconnected from each other, the alarm message is automatically sent to the TV 104. Thus, a viewer of the TV 104 can directly be notified that the elderly person goes out.

The CPU 201 includes a control unit which determines whether the predesignated mobile device (e.g., PDA 108) is disconnected from the home network 10, and a message sending unit which sends the alarm message the power-on device when the predesignated mobile device (e.g., PDA 108) is disconnected from the home network 10, in order to execute the automatic alarm message notifying service.

(2) Power-Off-Forget Preventing Service:

This service is a function of notifying a user of a predesignated mobile device (e.g., mobile phone 107 or PDA 108) of the power-on/power-off states of a plurality of devices by distributing the device management information 103 to the mobile device in advance. The mobile device has a function of automatically issuing an alarm indicative of the existence of a power-on device based on the device management information 103 distributed from the home server 101 when the mobile device is disconnected from the home network 10. Thus, the user of the mobile device can confirm whether he or she forgets to turn off the power of the device when he or she goes out.

(3) Automatic Power-Off Service

This service is a function of automatically switching a given device on the home network 10 from the power-on state to the power-off state when a predesignated mobile device (e.g., mobile phone 107 or PDA 108) is disconnected from the home network 10.

An explanation as to how the above automatic alarm message notifying service is executed will now be given with reference to FIG. 3.

Figure 3:
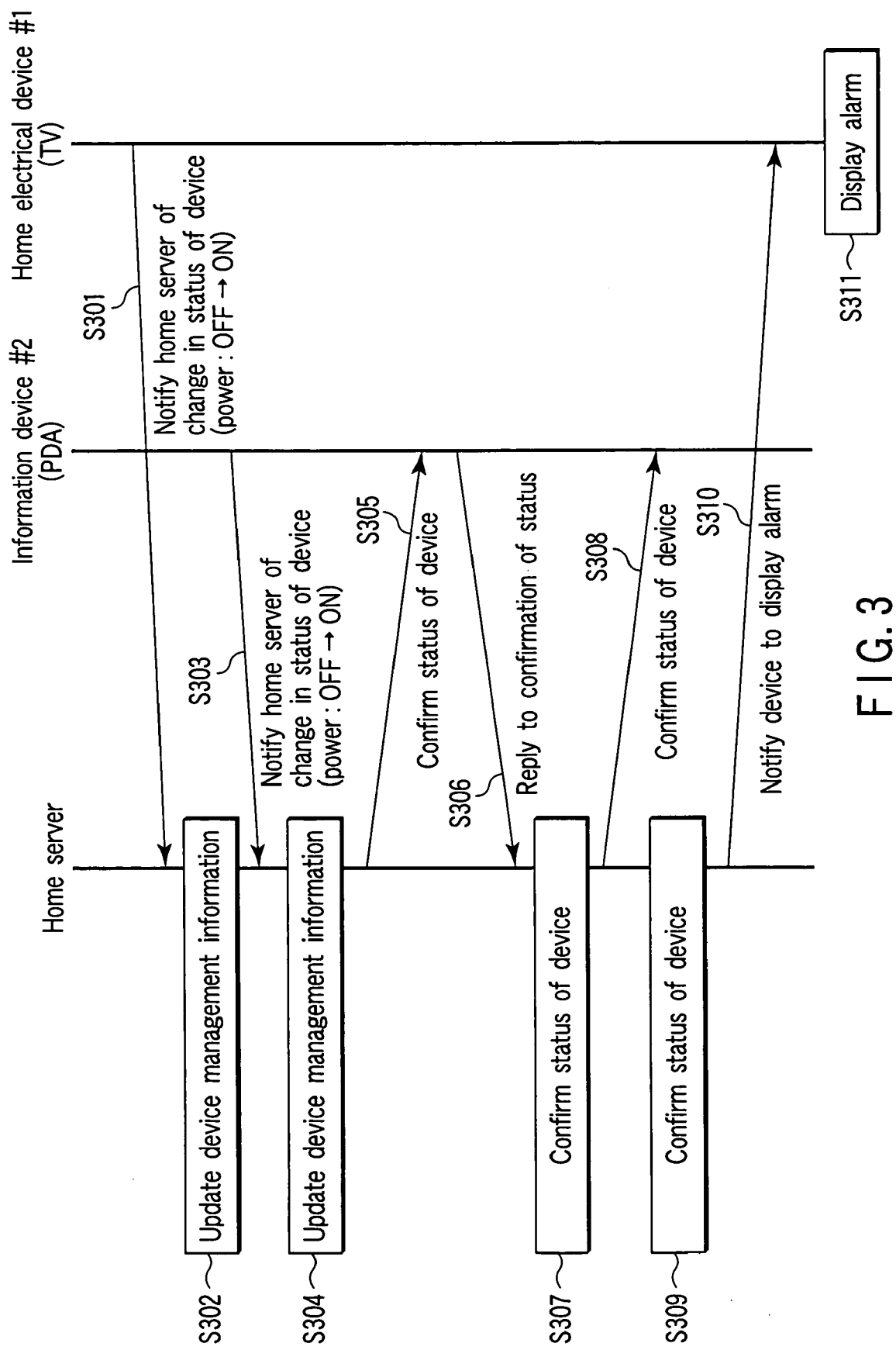
FIG. 3 is a chart of an automatic alarm message notifying operation in the home network system shown in FIG. 1.

FIG. 3 is a sequence chart showing a flow of an operation for when a mobile device predesignated as a device to be monitored is disconnected from the home network 10, sending an alarm message to another power-on device.

The operation flow will be described paying attention to only the TV 104 and PDA 108 of the devices 104 to 108 shown in FIG. 1 for the sake of brevity. The PDA 108 is a specific mobile device that is predesignated as a device to be monitored.

Assume that the TV 104 and PDA 108 are already connected to the home network 10 and the home server 101 assigns an IP address to each of the TV 104 and PDA 108.

When the TV 104 turns on, or the TV 104 shifts from the power-off state (standby state) to the power-on state (active state), the TV 104 notifies the home server 101 of the shift from the power-off state to the power-on state via the home network 10 (step S301). The home server 101 replies to the notification from the TV 104 and updates status information corresponding to the TV 104 in the device management information 103 from a value indicating the power-off state to a value indicating the power-on state (step S302).

If the TV 104 turns off, or if the TV 104 shifts from the power-on state (active state) to the power-off state (standby state), the TV 104 notifies the home server 101 of the shift from the power-on state to the power-off state via the home network 10. The home server 101 replies to the notification of the shift in state from the TV 104 to update status information corresponding to the TV 104 in the device management information 103 from a value indicating the power-on state to a value indicating the power-off state.

When the PDA 108 turns on, or when the PDA 108 shifts from the power-off state (standby state) to the power-on state (active state), it notifies the home server 101 of the shift in state via the home network 10 (step S303). The home server 101 replies to the notification from the PDA 108 to update status information corresponding to the PDA 108 in the device management information 103 from a value indicating the power-off state to a value indicating the power-on state (step S304).

In this way, the home server 101 monitors a power state of each device by communication between the communication device 204 and the device. The home server 101 can periodically send a message to each device in order to inquire the device of the current power state without each device sending a notification about a shift in state to the home server 101.

After that, the home server 101 periodically sends a state confirmation message to the PDA 108 via the home network 10 in order to detect that the PDA 108 is disconnected from the home network 10 (steps S305 and S308). If the PDA 108 is wirelessly connected to the home network 10, it gives a reply to the state confirmation message to the home server 101 via the home network 10 (step S306). The home server 101 confirms the state of the PDA 108, or whether the PDA 108 is wirelessly connected to the home network 10 in accordance with the presence or absence of a reply to the state confirmation message (steps S307 and S309).

Usually, even though a device is disconnected from the network, another device on the network cannot know the disconnection. Thus, the home server 101 sends a state confirmation message to a predesignated device to be monitored at regular time intervals to confirm whether the device is present on the home network 10. A period of minutes is usually enough for the time interval at which a state confirmation message is sent, but a period of seconds will be fine.

If the PDA 108 moves outside a communication area capable of wireless communication with the home network 10, or if the PDA 108 is disconnected from the home network 10, no reply to a state confirmation message is made. The home server 101 determines that the PDA 108 is disconnected from the home network 10 if no reply is returned when a given period of time elapses after the home server 101 sends a state confirmation message. Needless to say, the determination can be made not on only the condition that there is no reply to one state confirmation message even after a lapse of a given period of time but on the condition that no reply is made even though several (e.g., three) state confirmation messages are repeatedly sent.

When the home server 101 detects that the PDA 108 is disconnected from the home network 10, it sends an alarm message to a power-on device that is connected to the home network 10 via the home network 10 in order to notify the device that the PDA 108 is disconnected from the home network 10 (step S310). The home server 101 can detect the power-on device based on the status information of the device management information 103. If the TV 104 is currently powered on, the home server 101 sends an alarm message to the TV 104 via the home network 10 to notify the TV 104 that the PDA 108 is disconnected from the home network 10.

The alarm message indicates that the PDA 108 is disconnected from the home network 10 or an owner of the PDA 108 moves outside a communication area capable of wireless communication with the home network 10. In response to the alarm message, the TV 104 displays, for example, a character string such as "Missing" on the TV screen (the character string is superimposed on a TV image). If the PDA 108 is carried by an elderly person, a viewer of the TV 104 in another room can notice that he or she goes out.

The character string such as "Missing" can be stored in advance in the TV 104 or an alarm message including the character string can be sent to the TV 104 from the home server 101. In place of the character string, a voice signal such as "Missing" can be output from the TV 104 as voice.

If a plurality of devices connected to the home network 10 are currently powered on, an alarm message can be sent to each of the devices. It is thus possible to increase the possibility of notifying a family that an elderly person with the PDA 108 is missing. Any device can be used as a mobile device carried by an elderly person if it has a wireless communication function. The mobile device is not limited to an information device such as a mobile phone and a PDA. A wireless device that is much smaller than the mobile phone and PDA can be used.

In the home network system according to the embodiment of the present invention, when a pre-designated mobile device is disconnected from the home network 10, an alarm message is sent to another power-on device on the home network 10. There is a strong possibility that there is someone near the power-on device such as TV. If, therefore, the mobile device is carried by an elderly poriomaniac, a viewer of the power-on TV can be notified at once that he or she goes out.

Figure 4:
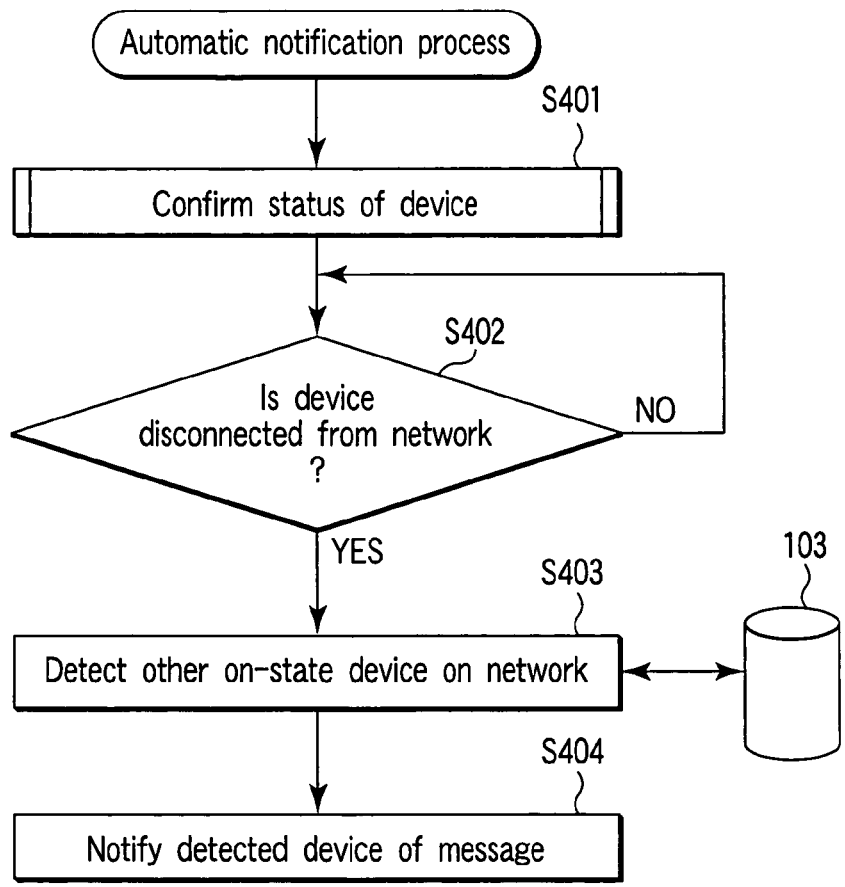
FIG. 4 is a flowchart of a procedure for the automatic alarm message notifying operation performed by the home server in the home network system shown in FIG. 1.

A procedure for the automatic alarm message notifying operation performed by the home server 101 will now be described with reference to the flowchart shown in FIG. 4.

The home server 101 communicates with devices 104 to 108 on the home server 10 using the communication device 204 to confirm the states of the devices 104 to 108 (step S401). In step S401, the home server 101 monitors whether a power state of each of the devices 104 to 108 is a power-on state or a power-off state, and also periodically confirms whether a designated specific device (mobile device) is present on the home network 10 or not.

When the home server 101 detects that the designated specific device is disconnected from the home network 10 (YES in step S402), it searches the device management information 103 for a power-on one of the devices connected to the home network 10 (step S403). By communication between the detected device and communication device 204, the home server 101 sends an alarm message to the detected device to notify the device that the designated specific device is disconnected from the home network 10 (step S404).

If the home server 101 detects a plurality of power-on devices in step S403, it sends an alarm message to the devices in step S404.

The alarm message can be sent not only to a device on the home network 10 but also to the mobile phone 107 by electronic mail via the Internet.

Figure 5:
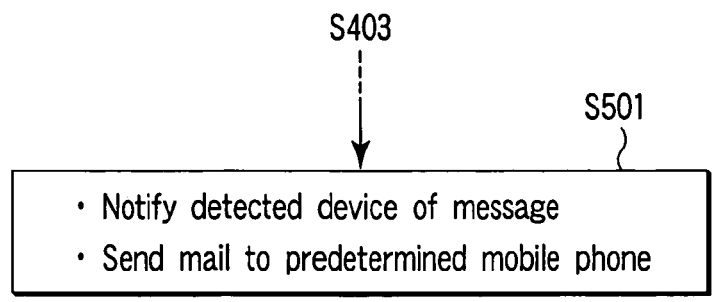
FIG. 5 is a flowchart of an automatic alarm message notifying operation performed by the home server in the home network system shown in FIG. 1 using electronic mail.

As shown in FIG. 5, the home server 101 detects a power-on device on the home network 10 (step S403) and then performs an operation of step S501. In step S501, the home server 101 sends an alarm message to the power-on device through the home network 10 and sends electronic mail including a character string of the alarm message to the mobile phone 107 via the Internet. Thus, even though an owner of the mobile phone 107 is out, he or she can be notified at once that an elderly person is missing.

An explanation as to how the above power-off-forget preventing service is executed will now be given with reference to FIG. 6.

Figure 6:
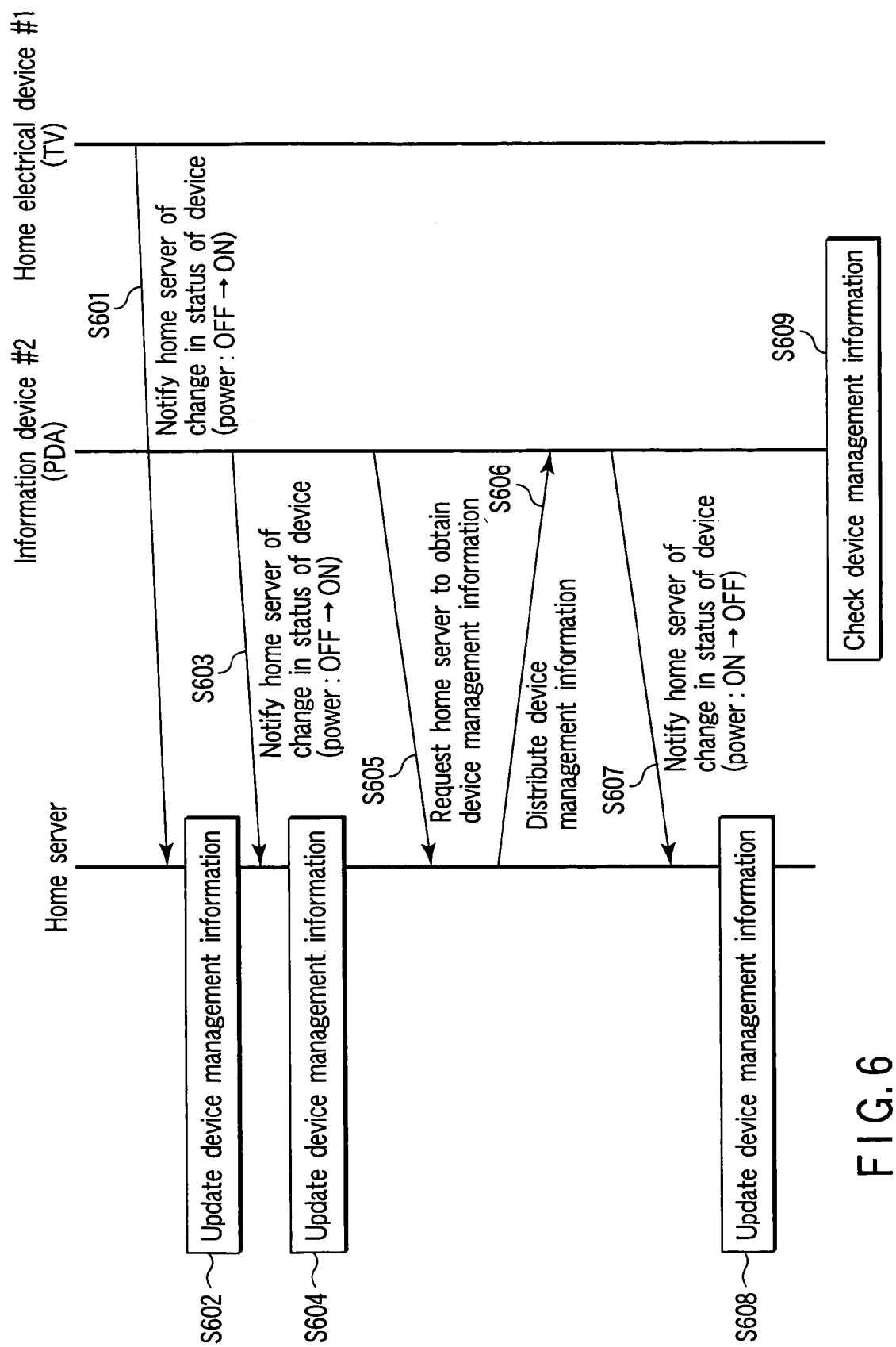
FIG. 6 is a flowchart of a power-off-forget preventing operation in the home network system shown in FIG. 1.

FIG. 6 is a sequence chart showing a flow of an operation of distributing the device management information 103 to the specific mobile device designated in advance to notify the specific mobile device of the power state of each device.

The flow of the operation in FIG. 6 will now be described paying attention to only the TV 104 and PDA 108 of the devices 104 to 108 shown in FIG. 1 for the sake of brevity. The PDA 108 is a specific mobile device designated in advance.

Assume that the TV 104 and PDA 108 are already connected to the home network 10 and an IP address has already been assigned to each of the TV 104 and PDA 108.

When the TV 104 turns on or the TV 104 shifts from the power-off state (standby state) to the power-on state (active state), the TV 104 notifies the home server 101 of the shift from the power-off state to the power-on state through the home network 10 (step S601). The home server replies to the notification from the TV 104 to update status information corresponding to the TV 104 in the device management information 103 from a value indicating the power-off state to a value indicating the power-on state (step S602). If the TV 104 turns off, or if the TV 104 shifts from the power-on state (active state) to the power-off state (standby state), it notifies the home server 101 of the shift in state through the home network 10. The home server 101 replies the notification of the shift in state from the TV 104 to update status information corresponding to the TV 104 in the device management information 103 from a value indicating the power-on state to a value indicating the power-off state.

When the PDA 108 in itself turns on, it notifies the home server 101 of a shift from the power-off state to the power-on state via the home network 10 (step S603). The home server 101 replies the notification from the PDA 108 to update status information corresponding to the PDA 108 in the device management information 103 from a value indicating the power-off state to a value indicating the power-on state (step S604).

The PDA 108 then sends a device management information request to the home server 101 via the home network 10 (step S605). In response to this request, the home server 101 sends the device management information 103 to the PDA 108 via the home network 10. Thus, the PDA 108 can acquire the power states of the devices on the home network 10 together from the home server 101 without checking the power states individually. The device management information request is periodically sent to the home server 101 from the PDA 108 at regular time intervals. The PDA 108 can recognize the latest power state of each of the devices.

When the user of the PDA 108 goes out, the PDA 108 is disconnected from the home network 10. If the user operates to disconnect the PDA 108 from the home network 10, the PDA 108 sends to the home server 101 a notification that the PDA 108 is disconnected or a notification that the PDA 108 shifts from the power-on state to the power-off state (step S607). In response to the notification, the home server 101 updates the device management information (step S608). The disconnection operation is not always necessary to perform. When the PDA 108 moves outside a communication area capable of wireless communication with the home network 10, it is automatically disconnected from the home network 10.

When the PDA 108 is disconnected from the home network 10, it performs an operation to check the contents of the device management information 103 acquired from the home server 101 (step S609). In step S609, the PDA 108 issues an alarm if a still power-on device remains on the home network 10. Thus, the user of the PDA 108 can confirm whether he or she forgets to turn off the power of a device when he or she is out.

Figure 7:
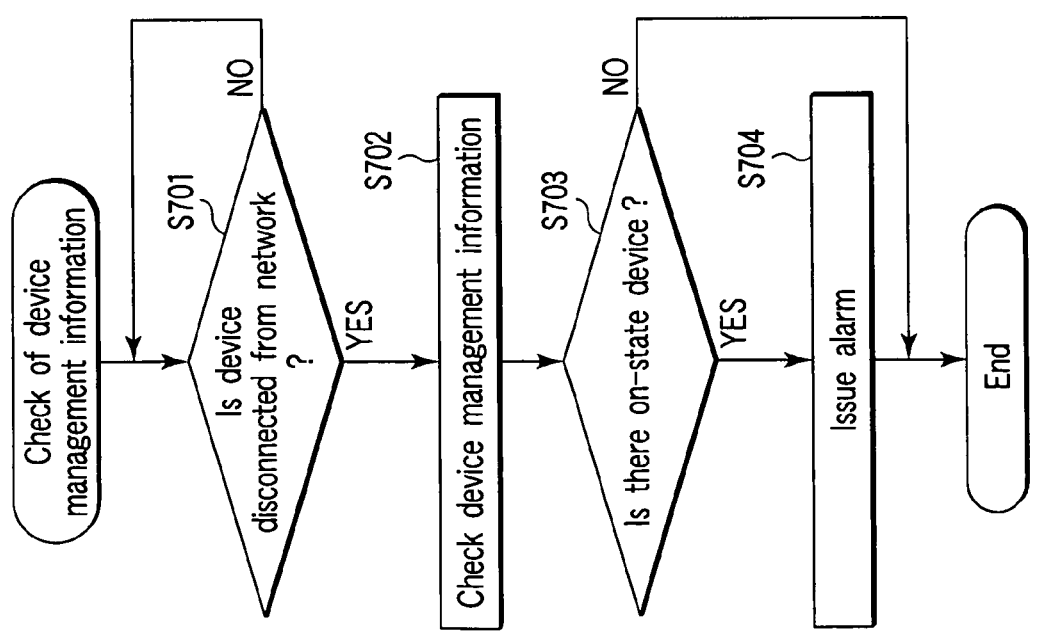
FIG. 7 is a flowchart of a procedure for a device management information checking operation performed by a mobile device in the home network system shown in FIG. 1.

A procedure for the device management information checking operation performed by the PDA 108 in step S609 will now be described with reference to the flowchart shown in FIG. 7.

The PDA 108 determines whether the PDA 108 in itself is disconnected from the home network 10 (step S701). When the PDA 108 detects that the PDA 108 is disconnected from the home network 10, the PDA 108 checks the contents of the device management information 103 acquired in advance from the home server 101 and determines whether a still power-on device remains on the home network 10 (steps S702 and S703).

If a still power-on device remains on the home network 10 (YES in step S703), the PDA 108 displays a character string indicating the name of the still power-on device on the screen of the PDA 108 and issues an alarm in order to notify the user that the still power-on device is present (step S704).

Figure 8:
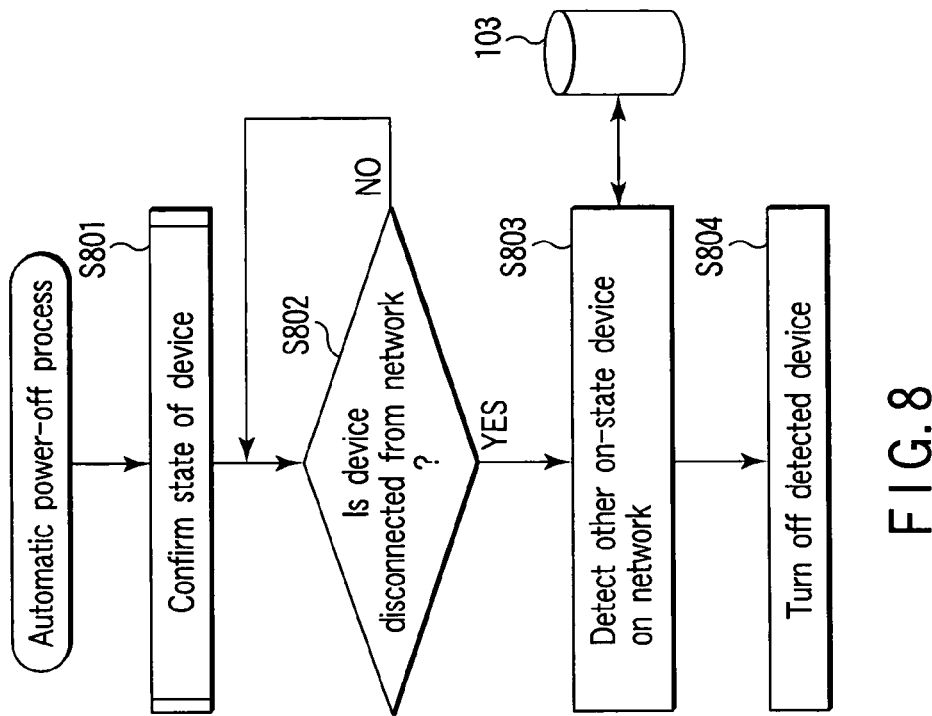
FIG. 8 is a flowchart of a procedure for an automatic power-off operation performed by the home server in the home network system shown in FIG. 1.

An automatic power-off operation performed by the home server 101 will now be described with reference to the flowchart shown in FIG. 8.

The home server 101 communicates with the devices 104 to 108 on the home server 10 using the communication device 204 to confirm the states of the devices 104 to 108 (step S801). In step S801, the home server 101 monitors whether the power state of each of the devices 104 to 108 is a power-on state or a power-off state and also periodically confirms whether a designated specific device (mobile device) is present on the home network 10.

When the home server 101 detects that the designated specific device is disconnected from the home network 10 (YES in step S802), it searches the device management information 103 for another power-on device on the home network 10 (step S803). By communication between the detected device and the communication device 204, the home server 101 sends a power-off command to the detected device via the home network 10 to turn off the power of the detected device (step S804).

A device whose disconnection is to be monitored can be designated for each of the automatic alarm message notifying operation, power-off-forget preventing operation and automatic power-off operation. These operations can thus be performed at the same time.

The contents of the device management information 103 managed by the home server 101 can be accessed by an external terminal via the Internet. If a remote-control command is sent to the home server 101 from an external terminal via the Internet, the home server 101 can control the power-on/power-off of each device on the home network 10.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a communication device which communicates with a mobile device and a plurality of devices via a network, the mobile device being adapted to be wirelessly connected to the network;
   a control unit configured to determine whether the mobile device is disconnected from the network;
   a message sending unit configured to send an alarm message to one of the plurality of devices by communication between the one of the plurality of devices and the communication device when the mobile device is disconnected from the network, the one of the plurality of devices being currently powered on;
   means for monitoring whether a power state of each of the plurality of devices is a power-on state or a power-off state by communication between the communication device and each of the plurality of devices; and
   means for detecting a power-on device among the plurality of devices based on a result of monitoring the power state of each of the plurality of devices when the mobile device is disconnected from the network,
   wherein the message sending unit includes means for sending the alarm message to the detected power-on device by communication between the detected power-on device and the communication device.

2. The electronic apparatus according to claim 1, wherein the message sending unit includes means for, when a plurality of power-on devices among the plurality of devices are detected, sending the alarm message to all of the detected power-on devices by communication between each of the detected power-on devices and the communication device.

3. The electronic apparatus according to claim 1, wherein the alarm message includes a message to make a notification that the mobile device moves outside a wireless communication area of the network.

4. The electronic apparatus according to claim 1, further comprising means for sending electronic mail including the alarm message to a predesignated mobile phone when the mobile device is disconnected from the network.

5. An electronic apparatus comprising:
   a communication device which communicates with a first mobile device and a plurality of devices via a network, the first mobile device being adapted to be wirelessly connected to the network;
   a control unit configured to determine whether the first mobile device is disconnected from the network;
   a message sending unit configured to send an alarm message to one of the plurality of devices by communication between the one of the plurality of devices and the communication device when the first mobile device is disconnected from the network, the one of the plurality of devices being currently powered on;
   means for monitoring whether a power state of each of the plurality of devices is a power-on state or a power-off state by communication between the communication device and each of the plurality of devices; and
   means for sending information indicative of the power state of each of the plurality of devices to a second mobile device adapted to be wirelessly connected to the network by communication between said second mobile device and the communication device.

6. An electronic apparatus comprising:
   a communication device which communicates with a first mobile device and a plurality of devices via a network, the first mobile device being adapted to be wirelessly connected to the network;
   a control unit configured to determine whether the first mobile device is disconnected from the network;
   a message sending unit configured to send an alarm message to one of the plurality of devices by communication between the one of the plurality of devices and the communication device when the first mobile device is disconnected from the network, the one of the plurality of devices being currently powered on;
   means for monitoring whether a power state of each of the plurality of devices is a power-on state or a power-off state by communication between the communication device and each of the plurality of devices;
   means for determining whether a second mobile device adapted to be wirelessly connected to the network is disconnected from the network; and
   means for turning off a power-on device among the plurality of devices on the network when said second mobile device is disconnected from the network.

7. A method of providing a service to a plurality of devices by an electronic apparatus that communicates with the devices via a network, the method comprising:
   determining whether a mobile device adapted to be wirelessly connected to the network is disconnected from the network;
   sending an alarm message to one of the plurality of devices on the network by communication between the one of the plurality of devices and the electronic apparatus when it is determined that the mobile device is disconnected from the network, the one of the plurality of devices being currently powered on;
   monitoring whether a power state of each of the plurality of devices is a power-on state or a power-off state by communication between the electronic apparatus and each of the of devices; and
   detecting a power-on device among the plurality of devices on the network based on a result of monitoring the power state of each of the plurality of devices when it is determined that the mobile device is disconnected from the network, wherein the alarm message sending includes sending the alarm message to the detected power-on device by communication between the detected power-on device and the electronic apparatus.

8. The method according to claim 7, wherein the alarm message sending includes sending the alarm message to all of a plurality of power-on devices by communication between each of the power-on devices and the electronic apparatus when the power-on devices are detected.

9. The method according to claim 7, further comprising sending electronic mail including the alarm message to a predesignated mobile phone when it is determined that the mobile device is disconnected from the network.

10. A method of providing a service to a plurality of devices by an electronic apparatus that communicates with the plurality of devices via a network, the method comprising:

determining whether a first mobile device adapted to be wirelessly connected to the network is disconnected from the network;

sending an alarm message to a power-on device among the plurality of devices on the network by communication between the power-on device and the electronic apparatus when it is determined that the first mobile device is disconnected from the network;

monitoring whether a power state of each of the plurality of devices is a power-on state or a power-off state by communication between the electronic apparatus and each of the plurality of devices; and sending information indicative of the power state of each of the plurality of devices to a second mobile device adapted to be wirelessly connected to the network by communication between said second mobile device and the electronic apparatus.

11. A method of providing a service to a plurality of devices by an electronic apparatus that communicates with the plurality of devices via a network, the method comprising:

determining whether a first mobile device adapted to be wirelessly connected to the network is disconnected from the network;

sending an alarm message to one of the plurality of devices by communication between the one of the plurality of devices and the electronic apparatus when it is determined that the first mobile device is disconnected from the network, the one of the plurality of devices being currently powered on;

monitoring whether a power state of each of the plurality of devices is a power-on state or a power-off state by communication between the electronic apparatus and each of the plurality of devices;

determining whether a second mobile device adapted to be wirelessly connected to the network is disconnected from the network; and turning off a power-on device among the plurality of devices on the network when it is determined that said second mobile device is disconnected from the network.

* * * * *

UNITED STATES PATENT AND TRADEMARK OFFICE
CERTIFICATE OF CORRECTION

PATENT NO. : 7,096,011 B2  Page 1 of 1
APPLICATION NO. : 10/805320
DATED : August 22, 2006
INVENTOR(S) : Kanazawa et al.

It is certified that error appears in the above-identified patent and that said Letters Patent is hereby corrected as shown below:

Claim 7, column 10, line 65, change "each of the" to --each of the plurality--.

Signed and Sealed this

Twelfth Day of December, 2006

JON W. DUDAS
*Director of the United States Patent and Trademark Office*